(12) United States Patent
Essenmacher (10) Patent No.: US 11,874,142 B2
(45) Date of Patent: Jan. 16, 2024

(54) COUPLING AND CONTROL ASSEMBLY INCLUDING A POSITION SENSOR

(71) Applicant: Means Industries, Inc., Saginaw, MI (US)

(72) Inventor: Ryan W. Essenmacher, Saginaw, MI (US)

(73) Assignee: MEANS INDUSTRIES, INC., Saginaw, MI (US)

( * ) Notice: Subject to any disclaimer, the term of this patent is extended or adjusted under 35 U.S.C. 154(b) by 96 days.

(21) Appl. No.: 17/171,067

(22) Filed: Feb. 9, 2021

(65) Prior Publication Data

US 2021/0302205 A1     Sep. 30, 2021

Related U.S. Application Data

(60) Provisional application No. 63/002,668, filed on Mar. 31, 2020.

(51) Int. Cl.
  *G01D 5/20*     (2006.01)
  *G01B 7/00*     (2006.01)
  (Continued)

(52) U.S. Cl.
  CPC ......... *G01D 5/2013* (2013.01); *F16D 41/125* (2013.01); *F16D 41/14* (2013.01);
  (Continued)

(58) Field of Classification Search
  CPC .... G01D 5/2013; G01D 5/202; F16D 41/125; F16D 41/14; F16D 2300/18; G01B 7/003; H02K 49/04
  See application file for complete search history.

(56) References Cited

U.S. PATENT DOCUMENTS

| | | |
|---|---|---|
| 4,050,560 A | 9/1977 | Torstenfelt |
| 4,340,133 A | 7/1982 | Blersch |
| | (Continued) | |

FOREIGN PATENT DOCUMENTS

WO    WO-2016160100 A1 * 10/2016 ............. F16D 27/14

OTHER PUBLICATIONS

CTI Magazine; Automotive Drivetrains; Dec. 2018; pp. 1-68; Dusseldorf, Germany.

*Primary Examiner* — Farhana A Hoque
*Assistant Examiner* — Joseph O Nyamogo
(74) *Attorney, Agent, or Firm* — Reising Ethington P.C.

(57) ABSTRACT

A coupling and control assembly including a non-contact, inductive displacement sensor is provided. The assembly includes a controllable coupling assembly including first and second coupling members supported for rotation relative to one another about a rotational axis. The first coupling member has a first coupling face which has a sensor pocket which receives the sensor. A control member made of an electrically conductive material is mounted for controlled, small-displacement, shifting movement relative to the sensor. The sensor is configured to create a magnetic field to induce eddy currents in the electrically conductive material of the control member wherein shifting movement of the control member changes a magnetic field caused by the eddy currents. The sensor provides a position feedback signal for vehicle transmission control, wherein the signal is correlated with the position of the control member.

25 Claims, 3 Drawing Sheets

(51) Int. Cl.
  *F16D 41/12* (2006.01)
  *F16D 41/14* (2006.01)
  *H02K 49/04* (2006.01)

(52) U.S. Cl.
  CPC ............ *G01B 7/003* (2013.01); *G01D 5/202* (2013.01); *H02K 49/04* (2013.01); *F16D 2300/18* (2013.01)

(56) References Cited

U.S. PATENT DOCUMENTS

| | | |
|---|---|---|
| 5,052,534 A | 10/1991 | Gustin et al. |
| 5,070,978 A | 12/1991 | Pires |
| 5,206,573 A | 4/1993 | McCleer et al. |
| 5,231,265 A | 7/1993 | Hackett et al. |
| 5,342,258 A | 8/1994 | Egyed |
| 5,362,093 A | 11/1994 | Romanauskas |
| 5,387,854 A | 2/1995 | McCleer et al. |
| 5,394,321 A | 2/1995 | McCleer et al. |
| 5,453,598 A | 9/1995 | Hackett et al. |
| 5,597,057 A | 1/1997 | Ruth et al. |
| 5,638,929 A | 6/1997 | Park |
| 5,642,009 A | 6/1997 | McCleer et al. |
| 5,678,668 A | 10/1997 | Sink |
| 5,846,257 A | 12/1998 | Hood |
| 5,918,715 A | 7/1999 | Ruth et al. |
| 5,924,510 A | 7/1999 | Itoh et al. |
| 5,927,455 A | 7/1999 | Baker et al. |
| 6,065,576 A | 5/2000 | Shaw et al. |
| 6,075,302 A | 6/2000 | McCleer |
| 6,193,038 B1 | 2/2001 | Scott et al. |
| 6,244,965 B1 | 6/2001 | Klecker et al. |
| 6,290,044 B1 * | 9/2001 | Burgman ............ F16D 41/125 192/85.48 |
| 6,328,670 B1 | 12/2001 | Minowa et al. |
| 6,503,167 B1 | 1/2003 | Sturm |
| 6,692,405 B2 | 2/2004 | Minowa |
| 6,814,201 B2 | 11/2004 | Thomas |
| 6,846,257 B2 | 1/2005 | Baker et al. |
| 6,953,409 B2 | 10/2005 | Schmidt et al. |
| 6,982,502 B1 | 1/2006 | Sendaula et al. |
| 7,093,512 B2 | 8/2006 | Ibamoto et al. |
| 7,153,228 B2 | 12/2006 | Fujiu et al. |
| 7,198,587 B2 | 4/2007 | Samie et al. |
| 7,223,198 B2 | 5/2007 | Kimes et al. |
| 7,256,510 B2 | 8/2007 | Holmes et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,349,010 B2 | 3/2008 | Bryan et al. |
| 7,464,801 B2 | 12/2008 | Wittkopp |
| 7,484,605 B2 | 2/2009 | Pawley et al. |
| 7,491,151 B2 | 2/2009 | Maguire et al. |
| 7,690,455 B2 | 4/2010 | Kano et al. |
| 7,695,387 B2 | 4/2010 | Oba et al. |
| 7,806,795 B2 | 10/2010 | Oba et al. |
| 7,942,781 B2 | 5/2011 | Kimes |
| 8,286,722 B2 | 10/2012 | Leimbach et al. |
| 8,720,659 B2 | 5/2014 | Pawley |
| 8,813,929 B2 | 8/2014 | Kimes |
| 8,888,637 B2 | 11/2014 | Kimes |
| 9,109,636 B2 | 8/2015 | Kimes et al. |
| 9,121,454 B2 | 9/2015 | Pawley |
| 9,186,977 B2 | 11/2015 | Kimes |
| 9,188,170 B2 | 11/2015 | Prout et al. |
| 9,255,614 B2 | 2/2016 | Kimes |
| 9,303,699 B2 | 4/2016 | Kimes et al. |
| 9,371,868 B2 | 6/2016 | Kimes et al. |
| 9,435,387 B2 | 9/2016 | Kimes et al. |
| 9,441,708 B2 | 9/2016 | Kimes et al. |
| 9,482,294 B2 | 11/2016 | Kimes |
| 9,482,297 B2 | 11/2016 | Brubaker et al. |
| 9,541,141 B2 | 1/2017 | Kimes et al. |
| 9,562,574 B2 | 2/2017 | Kimes |
| 9,638,266 B2 | 5/2017 | Kimes |
| 9,732,809 B2 | 8/2017 | Niemiec et al. |
| 9,874,252 B2 | 1/2018 | Kimes et al. |
| 2003/0102196 A1 | 6/2003 | Wetzel et al. |
| 2004/0110594 A1 | 6/2004 | Goto |
| 2006/0138777 A1 | 6/2006 | Hofbauer et al. |
| 2006/0185957 A1 | 8/2006 | Sedlacek et al. |
| 2006/0252589 A1 | 11/2006 | Tay |
| 2006/0278487 A1 | 12/2006 | Pawley et al. |
| 2007/0056825 A1 | 3/2007 | Fetting, Jr. et al. |
| 2007/0278061 A1 | 12/2007 | Wittkopp et al. |
| 2008/0110715 A1 | 5/2008 | Pawley |
| 2008/0169165 A1 | 7/2008 | Samie et al. |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2009/0084653 A1 | 4/2009 | Holmes |
| 2009/0098968 A1 | 4/2009 | Maguire et al. |
| 2009/0098970 A1 | 4/2009 | Kimes |
| 2009/0127059 A1 | 5/2009 | Knoblauch |
| 2009/0133981 A1 | 5/2009 | Tarasinski et al. |
| 2009/0142207 A1 | 6/2009 | Ring et al. |
| 2009/0159391 A1 | 6/2009 | Eisengruber |
| 2009/0194381 A1 | 8/2009 | Samie et al. |
| 2009/0211863 A1 | 8/2009 | Kimes |
| 2009/0255773 A1 | 10/2009 | Seufert et al. |
| 2010/0044141 A1 | 2/2010 | Kimes et al. |
| 2010/0071497 A1 | 3/2010 | Reisch et al. |
| 2010/0119389 A1 | 5/2010 | Lazebnik et al. |
| 2010/0200358 A1 | 8/2010 | Eisengruber et al. |
| 2010/0230226 A1 | 9/2010 | Prout |
| 2010/0252384 A1 | 10/2010 | Eisengruber |
| 2011/0140451 A1 | 6/2011 | Sharples et al. |
| 2011/0177900 A1 | 7/2011 | Simon |
| 2011/0215575 A1 | 9/2011 | Hofbauer et al. |
| 2011/0233026 A1 | 9/2011 | Pawley |
| 2012/0149518 A1 | 6/2012 | Kimes |
| 2013/0256078 A1 | 10/2013 | Kimes et al. |
| 2013/0277164 A1 | 10/2013 | Prout et al. |
| 2014/0100071 A1 | 4/2014 | Kimes |
| 2014/0190785 A1 * | 7/2014 | Fetting ............ F16D 25/088 192/41 R |
| 2015/0000442 A1 | 1/2015 | Kimes et al. |
| 2015/0001023 A1 | 1/2015 | Kimes |
| 2015/0014116 A1 | 1/2015 | Kimes et al. |
| 2016/0047439 A1 | 2/2016 | Kimes et al. |
| 2016/0131205 A1 | 5/2016 | Essenmacher |
| 2016/0131206 A1 | 5/2016 | Essenmacher |
| 2016/0369855 A1 | 12/2016 | Essenmacher |
| 2016/0377126 A1 | 12/2016 | Essenmacher |
| 2018/0010651 A1 | 1/2018 | Kimes |
| 2018/0038425 A1 | 2/2018 | Kimes |
| 2018/0066719 A1 * | 3/2018 | Klaser ............ F16D 48/06 |
| 2018/0106304 A1 | 4/2018 | Kimes et al. |
| 2018/0156332 A1 | 6/2018 | Kimes et al. |
| 2018/0231105 A1 | 8/2018 | Kimes et al. |
| 2018/0328419 A1 | 11/2018 | Hand et al. |
| 2018/0347642 A1 * | 12/2018 | Kimes ............ F16D 41/16 |
| 2019/0170198 A1 | 6/2019 | Kimes |
| 2020/0094676 A1 * | 3/2020 | Creech ............ B60K 23/04 |

* cited by examiner

COUPLING AND CONTROL ASSEMBLY INCLUDING A POSITION SENSOR

CROSS-REFERENCE TO RELATED APPLICATIONS

This application claims the benefit of U.S. provisional application Ser. No. 63/002,668 filed Mar. 31, 2020, the disclosure of which is hereby incorporated in its entirety by reference herein.

TECHNICAL FIELD

This invention generally relates to coupling and control assemblies, each of which has a non-contact inductive displacement sensor and, in particular, to such assemblies which use inductive position sensors to directly sense control member position.

OVERVIEW

A typical one-way clutch (OWC) consists of an inner ring, an outer ring and a locking device between the two rings. The one-way clutch is designed to lock in one direction and to allow free rotation in the other direction. Two types of one-way clutches often used in vehicular, automatic transmissions include:

Roller type which consists of spring loaded rollers between the inner and outer race of the one-way clutch. (Roller type is also used without springs on some applications); and Sprag type which consists of asymmetrically shaped wedges located between the inner and outer race of the one-way clutch.

The one-way clutches are typically used in the transmission to prevent an interruption of drive torque (i.e., power flow) during certain gear shifts and to allow engine braking during coasting.

Controllable or selectable one-way clutches (i.e., OWCs) are a departure from traditional one-way clutch designs. Selectable OWCs add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

Other related U.S. patent publications include: 2016/0377126; 2015/0014116; 2011/0140451; 2011/0215575; 2011/0233026; 2011/0177900; 2010/0044141; 2010/0071497; 2010/0119389; 2010/0252384; 2009/0133981; 2009/0127059; 2009/0084653; 2009/0194381; 20009/0142207; 2009/0255773; 2009/0098968; 2010/0230226; 2010/0200358; 2009/0211863; 2009/0159391; 2009/0098970; 2008/0223681; 2008/0110715; 2008/0169166; 2008/0169165; 2008/0185253; 2007/0278061; 2007/0056825; 2006/0252589; 2006/0278487; 2006/0138777; 2006/0185957; 2004/0110594; and the following U.S. Pat. Nos. 9,874,252; 9,732,809; 8,888,637; 7,942,781; 7,806,795; 7,695,387; 7,690,455; 7,491,151; 7,484,605; 7,464,801; 7,349,010; 7,275,628; 7,256,510; 7,223,198; 7,198,587; 7,093,512; 6,953,409; 6,846,257; 6,814,201; 6,503,167; 6,328,670; 6,692,405; 6,193,038; 4,050,560; 4,340,133; 5,597,057; 5,918,715; 5,342,258; 5,362,293; 5,678,668; 5,070,978; 5,052,534; 5,387,854; 5,231,265; 5,206,573; 5,453,598; 5,642,009; 6,075,302; 6,065,576; 6,982,502; 7,153,228; 5,924,510; and 5,918,715.

A linear motor is an electric motor that has had its stator and rotor "unrolled" so that instead of producing a torque (rotation) it produces a linear force along its length. The most common mode of operation is as a Lorentz-type actuator, in which the applied force is linearly proportional to the current and the magnetic field. U.S. published application 2003/0102196 discloses a bi-directional linear motor.

Linear stepper motors are used for positioning applications requiring rapid acceleration and high-speed moves with low mass payloads. Mechanical simplicity and precise open loop operation are additional features of stepper linear motor systems.

A linear stepper motor operates on the same electromagnetic principles as a rotary stepper motor. The stationary part or platen is a passive toothed steel bar extending over the desired length of travel. Permanent magnets, electro-magnets with teeth, and bearings are incorporated into the moving elements or forcer. The forcer moves bi-directionally along the platen, assuring discrete locations in response to the state of the currents in the field windings. In general, the motor is two-phase, however a larger number of phases can be employed.

The linear stepper motor is well known in the prior art and operates upon established principles of magnetic theory. The stator or platen component of the linear stepper motor consists of an elongated, rectangular steel bar having a plurality of parallel teeth that extends over the distance to be traversed and functions in the manner of a track for the so-called forcer component of the motor.

The platen is entirely passive during operation of the motor and all magnets and electromagnets are incorporated into the forcer or armature component. The forcer moves bi-directionally along the platen assuming discrete locations in response to the state of the electrical current in its field windings.

U.S. patent documents assigned to the same assignee as the present application and which are related to the present application include U.S. Pat. Nos. 8,813,929; 8,888,637; 9,109,636; 9,121,454, 9,186,977; 9,303,699; 9,435,387; 2012/0149518; 2013/0256078; 2013/0277164; 2014/0100071; 2015/0014116; 9,255,614; 2015/0001023; 9,371,868; 2016/0369855; 2016/0131206; 2016/0377126; 2016/0131205; 2016/0047439; 2018/0328419; 2018/0010651; 2018/0038425; 2018/0106304; 2018/0156332; 2018/0231105; 2019/0170198; 9,482,294; 9,482,297; 9,541,141; 9,562,574; 9,638,266; 8,286,722; 8,720,659; and 9,188,170. The disclosures of all of the above-noted, commonly assigned patent documents are hereby incorporated in their entirety by reference herein.

Some of the above related patent documents assigned to the assignee of the present application disclose a 2-position, linear, eCMD (electrically controllable mechanical diode). This device is a dynamic one-way clutch as both races (i.e. notch and pocket plates) rotate. The linear motor or actuator moves which, in turn, moves plungers coupled to struts, via a magnetic field produced by a stator. The actuator has a ring of permanent magnets that latches the clutch into two states, ON and OFF. Power is only consumed during the transition from one state to the other. Once in the desired state, the magnet latches and power is cut.

U.S. patent documents 2015/0000442; 2016/0047439; and U.S. Pat. No. 9,441,708 disclose 3-position, linear motor, magnetically-latching, 2-way CMDs.

Mechanical forces that are due to local or distant magnetic sources, i.e. electric currents and/or permanent magnet (PM) materials, can be determined by examination of the magnetic fields produced or "excited" by the magnetic sources. A magnetic field is a vector field indicating at any point in space the magnitude and direction of the influential capability of the local or remote magnetic sources. The strength or magnitude of the magnetic field at a point within any region of interest is dependent on the strength, the amount and the relative location of the exciting magnetic sources and the magnetic properties of the various mediums between the locations of the exciting sources and the given region of interest. By magnetic properties one means material characteristics that determine "how easy" it is to, or "how low" a level of excitation is required to, "magnetize" a unit volume of the material, that is, to establish a certain level of magnetic field strength. In general, regions which contain iron material are much easier to "magnetize" in comparison to regions which contain air or plastic material.

Magnetic fields can be represented or described as three dimensional lines of force, which are closed curves that traverse throughout regions of space and within material structures. When magnetic "action" (production of measurable levels of mechanical force) takes place within a magnetic structure these lines of force are seen to couple or link the magnetic sources within the structure. Lines of magnetic force are coupled/linked to a current source if they encircle all or a portion of the current path in the structure. Force lines are coupled/linked to a PM source if they traverse the PM material, generally in the direction or the anti-direction of the permanent magnetization. Individual lines of force or field lines, which do not cross one another, exhibit levels of tensile stress at every point along the line extent, much like the tensile force in a stretched "rubber band," stretched into the shape of the closed field line curve. This is the primary method of force production across air gaps in a magnetic machine structure.

One can generally determine the direction of net force production in portions of a magnetic machine by examining plots of magnetic field lines within the structure. The more field lines (the more stretched rubber bands) in any one direction across an air gap separating machine elements, the more "pulling" force between machine elements in that given direction.

As used herein, the term "sensor" is used to describe a circuit or assembly that includes a sensing element and other components. In particular, as used herein, the term "magnetic field sensor" is used to describe a circuit or assembly that includes a magnetic field sensing element and electronics coupled to the magnetic field sensing element.

As used herein, the term "magnetic field sensing element" is used to describe a variety of electronic elements that can sense a magnetic field. The magnetic field sensing elements can be, but are not limited to, Hall effect elements, magnetoresistance elements, or magnetotransistors. As is known, there are different types of Hall effect elements, for example, a planar Hall element, a vertical Hall element, and a circular vertical Hall (CVH) element. As is also known, there are different types of magnetoresistance elements, for example, a giant magnetoresistance (GMR) element, an anisotropic (TMR) element, an Indium antimonide (InSb) sensor, and a magnet tunnel junction (MTJ).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while magnetoresistance elements and vertical Hall elements (including circular vertical Hall (CVH) sensing elements) tend to have axes of sensitivity parallel to a substrate.

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field.

Modern automotive vehicles employ an engine transmission system having gears of different sizes to transfer power produced by the vehicle's engine to the vehicle's wheels based on the speed at which the vehicle is traveling. The engine transmission system typically includes a clutch mechanism which may engage and disengage these gears. The clutch mechanism may be operated manually by the vehicle's driver, or automatically by the vehicle itself based on the speed at which the driver wishes to operate the vehicle.

In automatic transmission vehicles, a need arises for the vehicle to sense the position of the clutch for smooth, effective shifts between gears in the transmission and for overall effective transmission control. Therefore, a clutch position sensing component for sensing the linear position of the clutch may be used by automatic transmission vehicles to facilitate gear shifting and transmission control.

Current clutch-position sensing components utilize magnetic sensors. One advantage to using magnetic sensors is that the sensor need not be in physical contact with the object being sensed, thereby avoiding mechanical wear between the sensor and the object. However, actual linear clutch measurement accuracy may be compromised when the sensor is not in physical contact with the sensed object because of a necessary gap or tolerance that exists between the sensor and the object. Moreover, current sensing systems addressing this problem use coils and certain application-specific integrated circuits which are relatively expensive.

U.S. Pat. No. 8,324,890 discloses a transmission clutch position sensor which includes two Hall sensors located at opposite ends of a flux concentrator outside the casing of the transmission to sense a magnetic field generated by a magnet attached to the clutch piston. To reduce sensitivity to magnet-to-magnet gap tolerances, a ratio of the voltage of one Hall sensor to the sum of the voltages from both Hall sensors is used to correlate to the piston and, hence, clutch position.

The following U.S. and foreign patent documents are related to the present invention: GB 253319; DE 102016118266; FR 3025878; and U.S. Pat. No. 10,247,578.

For purposes of this application, the term "coupling" should be interpreted to include clutches or brakes wherein one of the plates is driveably connected to a torque delivery element of a transmission and the other plate is driveably connected to another torque delivery element or is anchored and held stationary with respect to a transmission housing. The terms "coupling," "clutch" and "brake" may be used interchangeably.

Despite the above, there is still a need to directly sense control member or selector plate position since sensing which occurs at the actuator of the selector plate has the potential to incorrectly report clutch state in the event of damage to the actuator.

SUMMARY OF EXAMPLE EMBODIMENTS

An object of at least one embodiment of the present invention is to provide a coupling and control assembly including at least one non-contact inductive displacement sensor which directly senses control member position wherein there is no need to indirectly infer state of the assembly.

In carrying out the above object and other objects of at least one embodiment of the present invention, a coupling and control assembly including a non-contact, inductive displacement sensor is provided. The assembly includes a controllable coupling assembly including first and second coupling members supported for rotation relative to one another about a rotational axis. The first coupling member has a first coupling face having a locking member pocket which receives a locking member. The first coupling face also has a sensor pocket which receives the sensor. The second coupling member has a second coupling face having a set of locking formations. A control member made of an electrically conductive material is mounted for controlled, small-displacement, shifting movement between the first and second coupling faces relative to the locking member and the sensor for controlling position of the locking member. The control member allows the locking member to engage one of the locking formations in a first position of the control member and the control member maintains the locking member in the locking member pocket in a second position of the control member. The sensor is configured to create a magnetic field to induce eddy currents in the electrically conductive material of the control member wherein shifting movement of the control member changes a magnetic field caused by the eddy currents. The sensor provides a position feedback signal for vehicle transmission control wherein the signal is correlated with the position of the control member.

The control member may be rotatable about the rotational axis wherein the sensor is a rotary position sensor.

The control member may be an electrically conductive selector plate.

The control member may include an aperture which is at least partially axially aligned with the sensor during shifting movement between the first and second positions to change the magnetic field caused by the eddy currents.

The sensor may include a printed circuit board wherein the control member may be supported proximate the board.

The sensor may include a transmitter coil having a resonant frequency which changes when the control member moves.

The first and second coupling members may be pocket and notch plates, respectively.

The locking member may be a strut.

The control member may be an apertured control member.

Still further in carrying out the above object and other objects of at least one embodiment of the present invention, a clutch and control assembly including a non-contact, inductive displacement sensor is provided. The assembly includes a controllable clutch assembly including first and second clutch members supported for rotation relative to one another about a rotational axis. The first clutch member has a first clutch face having a plurality of locking member pockets. Each of the pockets receives a locking member. The first clutch face also has a sensor pocket which receives the sensor. The second clutch member has a second clutch face having a set of locking formations. A control member is made of an electrically conductive material and is mounted for controlled, small-displacement, shifting movement between the first and second clutch faces relative to the locking members and the sensor for controlling position of the locking members. The control member allows the locking members to engage the locking formations in a first position of the control member and the control member maintains the locking members in their locking member pockets in a second position of the control member. The sensor is configured to create a changing magnetic field to induce eddy currents in the electrically conductive material of the control member wherein the shifting movement of the control member changes a magnetic field caused by the eddy currents. The sensor provides a position feedback signal for vehicle transmission control, wherein the signal is correlated with the position of the control member.

The control member may be rotatable about the rotational axis wherein the sensor is a rotary position sensor.

The control member may be an electrically conductive selector plate.

The control member may include an aperture which is at least partially axially aligned with the sensor during shifting movement between the first and second positions to change the magnetic field caused by the eddy currents.

The sensor may include a printed circuit board wherein the control member may be supported proximate the board.

The sensor may include a transmitter coil having a resonant frequency which changes when the control member moves.

The first and second clutch members may be pocket and notch plates, respectively.

Each of the locking members may be a strut.

The control member may be an apertured control member.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
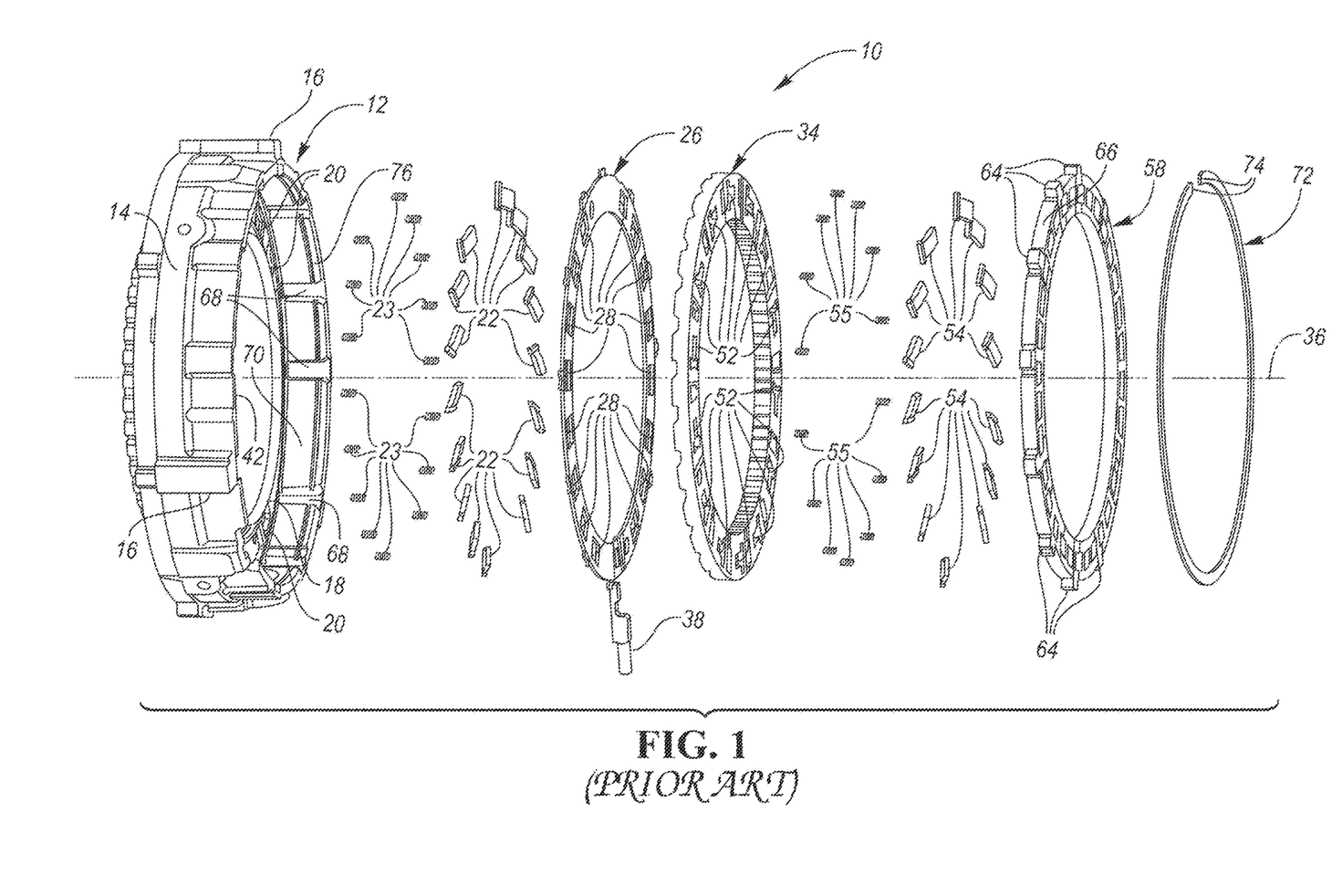
FIG. 1 is an exploded, perspective view of a prior art overrunning coupling and clutch assembly which is modified in accordance with at least one embodiment of the present invention.

Referring again to the drawing figures, FIG. 1 is an exploded perspective view of a prior art overrunning clutch or coupling assembly, generally indicated at 10, which is modified in accordance with at least one embodiment of the present invention. However, it is to be understood that the present invention can be utilized with a wide variety of properly modified selectable clutches, such as clutches having three or more operating modes or states. In fact, the present invention may be used with controllable mechanical diodes (CMDs) having an infinite number of operating modes or mechanical states.

As described in U.S. Pat. No. 8,602,187, and published in U.S. patent application No. 2014/0190785, both assigned to the assignee of the present application, the assembly 10 includes an annular reverse pocket plate or first outer coupling member, generally indicated at 12. An outer axially-extending surface 14 of the plate 12 has external splines 16 for coupling the plate 12 to the inner surface of a transmission case (not shown). An inner radially extending surface or coupling face 18 of the plate 12 is formed with spaced pockets 20 in which reverse struts 22 are pivotally biased outwardly by coil springs disposed in the pockets 20 under their respective struts 22. Preferably, twelve reverse struts 22 are provided. However, it is to be understood that a greater or lesser number of reverse struts 22 may be provided.

The assembly 10 also includes a control member or element in the form of a selector slide plate, generally indicated at 26, having a plurality of spaced apertures 28 extending completely therethrough to allow the reverse struts 22 to pivot in their pockets 20 and extend through the aperture 28 to engage spaced locking formations or ramped reverse notches (not shown) formed in radially extending surface or coupling face of a forward or inner pocket plate or coupling member, generally indicated at 34, when the plate 26 is properly angularly positioned about a common central rotational first axis 36 by an output member in the form of an actuator pin or arm 38. The pin 38 is coupled or secured to the plate 26 to move therewith.

The pin 38 may extend through a notch or elongated slot formed through a wall or wall portion of an outer circumferential end wall 4 of the plate 12 as shown in U.S. Pat. No. 8,602,187. The wall may be a common wall separating and shared by the first coupling member 12 and a housing of the control system. The elongated slot may extend between and thereby communicate an inner surface of the housing and an inner surface of the wall of the first coupling member or plate 12. The pin 38 may move in the slot between different use positions to cause the plate 26 to slide or shift between its control positions to alternatively cover or uncover the struts 22 (i.e. to engage or disengage the reverse struts 22, respectively).

The plate 34 comprises a splined ring having internal splines formed at its inner axially extending surface. A radially extending surface or coupling face spaced from the other coupling face (not shown) of the plate 34 has a plurality of spaced pockets 52 formed therein to receiver a plurality of forward struts 54 therein which are pivotally biased by corresponding coil springs 55. Preferably, fourteen forward struts 54 are provided. However, it is to be understood that a greater or lesser number of forward struts 54 may be provided.

The assembly 10 may also include a second outer coupling member or notch plate, generally indicated at 58, which has a plurality of locking formations, cams or notches (not shown) formed in a radially extending surface or coupling face (not shown) thereof by which the forward struts 54 lock the forward plate 34 to the notch plate 58 in one direction about the axis 36 but allow free-wheeling in the opposite direction about the axis 36. The notch plate 58 includes external splines 64 which are formed on an outer axial surface 66 of the plate 58 and which are received and retained within axially extending recesses 68 formed within the inner axially extending surface 47 of the outer circumferential end wall of the plate 12.

The assembly 10 may further include a snap ring, generally indicated at 72, having end portions 74 and which fits within an annular groove 76 formed within the inner surface of the end wall of the plate 12 to hold the plates 12, 26, 34 and 48 together and limit axial movement of the plates relative to one another.

The pin 38 has a control position to disengage the reverse struts 22. In one embodiment, a pin 38 is rotated about 7° in a forward overrun direction about the axis 36 to rotate the selector plate 26 to, in turn, allow the reverse struts 22 to move from their disengaged position in their pockets 20 to their engaged position with the notches (not shown) of the plate 34.

As described above, a typical selectable one-way clutch consists of a notch plate, a pocket plate, a selector plate, struts, springs, and a snap ring. The notch plate and the pocket plate rotate relative to one another. The struts, when engaged, prevent rotation in one direction but the selector plate can prevent the struts from engaging. The position of the selector plate is typically controlled by a hydraulically actuated mechanism called an actuator arm.

The prior art way to identify the position of the selector plate is by sensing the position of the actuator arm. If the actuator arm were to detach from the selector plate, there would no longer be a way to find the position of the selector plate. The valve's position has previously been measured with Hall cells but the position of the valve was measured on a prototype basis only.

The importance of knowing the position of the selector plate is that if the part were to lock in the wrong conditions the vehicle would be suddenly pulled into first gear. A vehicle pulled into first gear on the highway could damage the engine from extreme engine speeds. Monitoring the selector plate position can help protect against the risk of unwanted clutch state changes. The sensor could also detect if the actuator arm is damaged and restrict the transmission from shifting.

Due to the above noted scenarios, there is need for a more direct way to find the position of the openings in the selector plate.

An object of at least one embodiment of the present invention is to locate the selector plate directly with an eddy current or inductive position sensor. As disclosed hereinbelow, location or position of a selector plate 26' can be equated to changes in the output of an eddy current or inductive displacement sensor 100.

Figure 2:
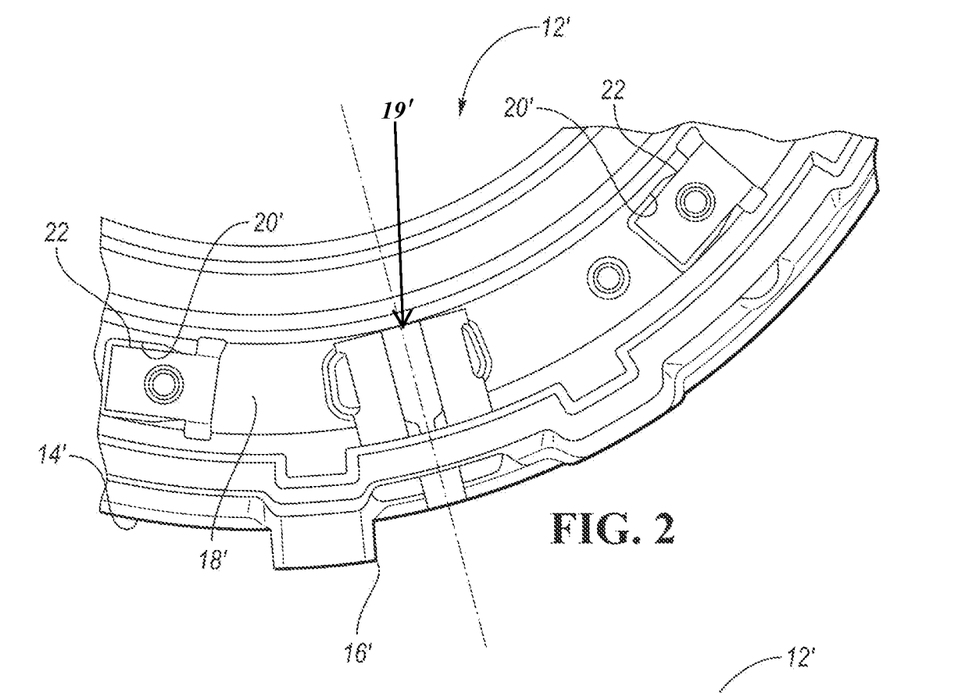
FIG. 2 is a top plan view, partially broken away, of a pocket plate modified in accordance with at least one embodiment of the present invention.
Figure 3:
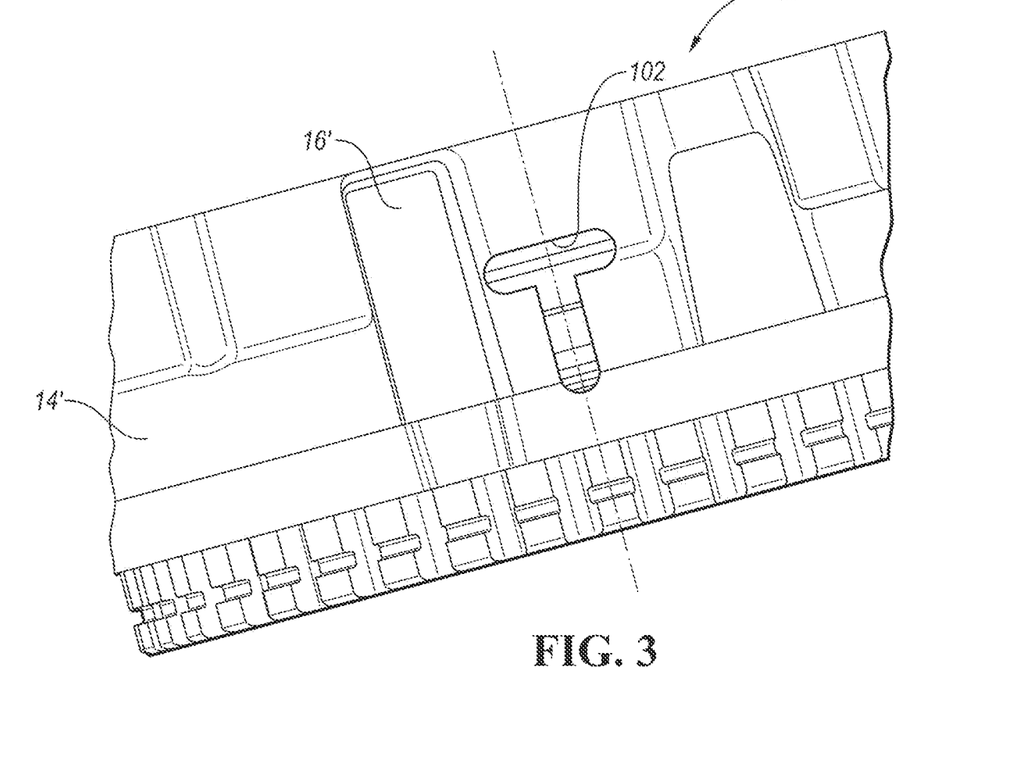
FIG. 3 is a side elevational view, partially broken away, of the modified pocket plate of FIG. 2.
Figure 4:
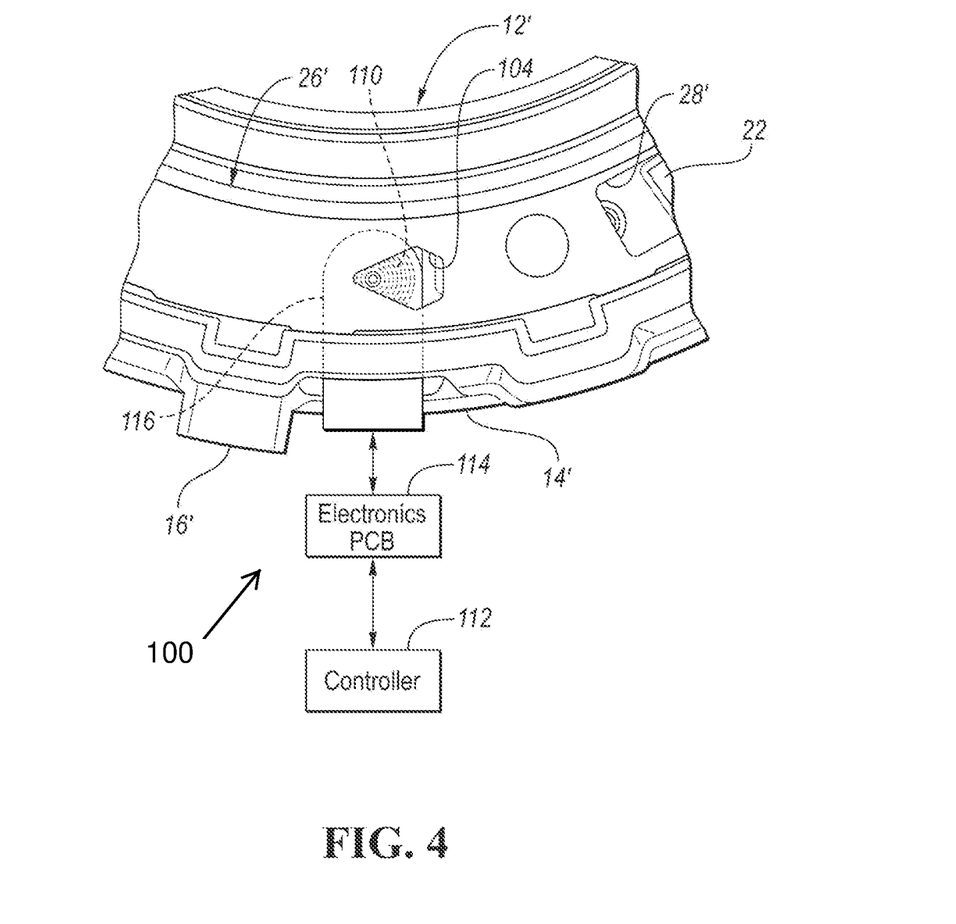
FIG. 4 is a top plan view, partially broken away, of the modified pocket plate of FIGS. 2 and 3 but now including an apertured selector plate, a sensor, and a vehicle controller.

Referring now to FIGS. 2, 3 and 4 there is illustrated a pocket plate 12' and a selector plate 26', both of which have been modified from the assembly 10 of FIG. 1 to allow a non-contact, inductive displacement sensor, generally indicated at 100, to directly sense control member or selector plate movement. The sensor 100 may include a coil PCB 116 on which one or more coils 110 are supported and an electronics PCB 114 which supports the active electronics (not shown) of the sensor 100.

Parts illustrated in FIGS. 2, 3 and 4 which are the same as the parts of FIG. 1, such as the struts 26, have the same reference number. Parts illustrated in FIGS. 2, 3 and 4 which are part of the modified assembly have the same reference number as the corresponding part of the assembly 100, but a single prime designation (i.e. a surface 14', splines 16', a coupling face 18', pockets 20', a plate 26' and apertures 28'). New features or parts are given a new reference number such as the sensor 100, an aperture 102 formed through a wall of the pocket plate 12' and a wedge shaped hole 104 formed in the selector plate 26'. The hole 104 is a dedicated opening in the selector plate 26' for the sensor 100 to target. The sensor 100 is mounted below the selector plate 26' in a sensor pocket 19' formed in the pocket plate 12'. The aperture 102 has a size and shape to allow the coil PCB 116 of the sensor 100 to be inserted through a side wall of the pocket plate 12' and into the sensor pocket 19' formed in the coupling face 18' of the pocket plate 12'. The electronics PCB 114 typically remains outside the pocket plate 12'. The two PCB's 114 and 116 may be stacked vertically and horizontally offset from one another.

The eddy current sensor 100 works by creating, changing magnetic fields in one or more coils 110 of the sensor 100 to induce loops of eddy currents in the electrically conductive material of the selector plate 26'. The resultant circular flow of electric current in the conductive material creates an electromagnet, which opposes the magnetic field of the coil 110. The sensor 100 can measure the change in the magnetic field caused by the eddy currents and this change correlates to how close the electrically conductive material of the selector plate 26' is to the sensor 100. There is a coupling between the coil's magnetic field and the eddy currents similar to the coupling between the windings of a transformer that creates a mutual inductance. The coupling is distance dependent and changes in coupling affect the inductance of the coil 100 and coupling system. The change in inductance is measured from the change in the resonant frequency of the coil 100. As the current reaches a steady state amplitude the inductance of the system can be calculated from the measured time constant and known resistance of the sensor's electronics. The sensor 100 can be modeled as a lossy inductor in parallel with a capacitor.

With the inductance, capacitance and resistance of the sensor 100 known, the resonant frequency can be calculated.

The eddy current or inductive position sensor 100 outputs a value to a vehicle controller 112 for use in controlling the vehicle's transmission that is relatively high when the sensor 100 is below the air gap or hole 104 and is relatively low when the sensor 100 is below a non-apertured portion of the selector plate 26'.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coupling and control assembly, comprising:
a controllable coupling assembly including first and second coupling members supported for rotation relative to one another about a rotational axis, the first coupling member having a first coupling face having a locking member pocket which receives a locking member, the second coupling member having a second coupling face having a set of locking formations;
a control member rotatable about the rotational axis and made of an electrically conductive material and mounted for controlled shifting movement between the first and second coupling faces relative to the locking member for controlling position of the locking member, the control member allowing the locking member to engage one of the locking formations in a first position of the control member and the control member maintaining the locking member in the locking member pocket in a second position of the control member, and the control member includes a sensor aperture; and
a rotary position sensor configured to create a magnetic field to induce eddy currents in the electrically conductive material of the control member and at least partially axially aligned with the sensor aperture of the control member during the shifting movement of the control member between the first and second positions, wherein the shifting movement of the control member changes the magnetic field caused by the eddy currents, and the sensor providing a position feedback signal for vehicle transmission control, wherein the signal is correlated with the position of the control member.

2. The coupling and control assembly as claimed in claim 1, wherein the control member is an electrically conductive selector plate.

3. The coupling and control assembly as claimed in claim 1, wherein the sensor aperture of the control member is wedge-shaped.

4. The coupling and control assembly as claimed in claim 1, wherein the sensor includes a printed circuit board and wherein the control member is supported proximate the board.

5. The coupling and control assembly as claimed in claim 1, wherein the sensor includes a transmitter coil having a resonant frequency which changes when the control member moves.

6. The coupling and control assembly as claimed in claim 1, wherein the first and second coupling members are pocket and notch plates, respectively.

7. The coupling and control assembly as claimed in claim 1, wherein the locking member is a strut.

8. The coupling and control assembly as claimed in claim 1, wherein the control member is an apertured control member.

9. The coupling and control assembly as claimed in claim 1, wherein the first coupling face also having a sensor pocket which receives the sensor.

10. The coupling and control assembly as claimed in claim 1, wherein the pocket plate has a side wall and a sensor aperture through the side wall.

11. The coupling and control assembly as claimed in claim 1, wherein the position sensor is non-contact, inductive displacement sensor.

12. A clutch and control assembly, comprising:
a controllable clutch assembly including first and second clutch members supported for rotation relative to one another about a rotational axis, the first clutch member having a first clutch face having a plurality of locking member pockets, each of the pockets receiving a locking member, the second clutch member having a second clutch face having a set of locking formations;

a selector plate rotatable about the rotational axis and made of an electrically conductive material and mounted for controlled shifting movement between the first and second clutch faces relative to the locking members for controlling position of the locking members, the selector plate allowing the locking members to engage the locking formations in a first position of the selector plate and the selector plate maintaining the locking members in their locking member pockets in a second position of the selector plate, and the selector plate includes a sensor aperture; and a rotary position sensor configured to create a changing magnetic field to induce eddy currents in the electrically conductive material of the selector plate and at least partially axially aligned with the sensor aperture of the selector plate during the shifting movement of the selector plate between the first and second positions, wherein the shifting movement of the selector plate changes the magnetic field caused by the eddy currents, the sensor providing a position feedback signal for vehicle transmission control, wherein the signal is correlated with the position of the selector plate.

13. The clutch and control assembly as claimed in claim 12, wherein the pocket plate has a side wall and a sensor aperture through the side wall through which a portion of the sensor extends.

14. The clutch and control assembly as claimed in claim 12, wherein the sensor aperture of the selector plate is wedge-shaped.

15. The clutch and control assembly as claimed in claim 12, wherein the sensor includes a printed circuit board and wherein the selector plate is supported proximate the board.

16. The clutch and control assembly as claimed in claim 12, wherein the sensor includes a transmitter coil having a resonant frequency which changes when the selector plate moves.

17. The clutch and control assembly as claimed in claim 12, wherein the first and second clutch members are pocket and notch plates, respectively.

18. The clutch and control assembly as claimed in claim 12, wherein each of the locking members is a strut.

19. The clutch and control assembly as claimed in claim 12, wherein the selector plate is an apertured selector plate.

20. The clutch and control assembly as claimed in claim 12, wherein the first clutch face also having a sensor pocket which receives the sensor.

21. The clutch and control assembly as claimed in claim 12, wherein the position sensor is non-contact, inductive displacement sensor.

22. An overrunning clutch assembly rotatable about a longitudinal axis, comprising:

a pocket plate including a pocket plate coupling face extending radially with respect to the longitudinal axis and having locking member pockets;

a notch plate including a notch plate coupling face extending radially with respect to the longitudinal axis, facing the pocket plate coupling face of the pocket plate, and having locking formations;

locking members in the locking member pockets of the pocket plate coupling face of the pocket plate and selectively engageable with the locking formations of the notch plate coupling face of the notch plate;

a rotatable selector plate rotatable about the longitudinal axis and located between the pocket plate and the notch plate to selectively control movement of the locking members into and out of engagement with the locking formations of the notch coupling face of the notch plate, and including a sensor aperture; and a rotary position sensor at least partially axially aligned with the sensor aperture of the selector plate to directly sense rotational position of the selector plate.

23. The overrunning clutch assembly of claim 22, wherein the position sensor is carried in a sensor pocket in the pocket plate coupling face of the pocket plate.

24. The overrunning clutch assembly of claim 22, wherein the position sensor extends through an aperture in an outer circumferentially extending side wall of the pocket plate.

25. The overrunning clutch assembly of claim 22, wherein the sensor aperture is wedge-shaped.

* * * * *